US008296150B2

(12) United States Patent
Bradley et al.

(10) Patent No.: US 8,296,150 B2
(45) Date of Patent: Oct. 23, 2012

(54) SYSTEM AND METHOD FOR AUDIO CONTENT NAVIGATION

(75) Inventors: Nathan T. Bradley, Tucson, AZ (US); David Ide, Tucson, AZ (US)

(73) Assignee: AudioEye, Inc., Tucson, AZ (US)

( * ) Notice: Subject to any disclaimer, the term of this patent is extended or adjusted under 35 U.S.C. 154(b) by 0 days.

(21) Appl. No.: 13/214,347

(22) Filed: Aug. 22, 2011

(65) Prior Publication Data

US 2011/0307259 A1     Dec. 15, 2011

(51) Int. Cl.
*G10L 21/00*     (2006.01)

(52) U.S. Cl. ............... 704/270.1; 709/224; 709/217; 709/203; 709/247; 709/218; 705/319; 715/733; 715/205

(58) Field of Classification Search ............... 704/270.1; 709/224, 217, 203, 247, 219, 218, 202; 705/319; 715/733, 205
See application file for complete search history.

(56) References Cited

U.S. PATENT DOCUMENTS

| | | | | |
|---|---|---|---|---|
| 5,918,223 A | * | 6/1999 | Blum et al. ............ 707/999.001 |
| 5,991,781 A | * | 11/1999 | Nielsen .................... 715/236 |
| 6,240,448 B1 | * | 5/2001 | Imielinski et al. ............ 709/218 |
| 6,606,374 B1 | * | 8/2003 | Rokoff et al. ............... 379/88.16 |
| 6,934,684 B2 | * | 8/2005 | Alpdemir et al. ............. 704/265 |
| 7,106,220 B2 | * | 9/2006 | Gourgey et al. ............. 341/27 |
| 7,124,366 B2 | * | 10/2006 | Foreman et al. ............. 715/719 |
| 7,174,293 B2 | * | 2/2007 | Kenyon et al. ................ 704/231 |
| 7,194,752 B1 | * | 3/2007 | Kenyon et al. ................ 725/22 |
| 7,284,255 B1 | * | 10/2007 | Apel et al. ................... 725/18 |
| 2002/0003547 A1 | * | 1/2002 | Wang et al. .................. 345/727 |
| 2002/0007379 A1 | * | 1/2002 | Wang et al. .................. 707/515 |
| 2002/0023020 A1 | * | 2/2002 | Kenyon et al. ................ 705/26 |
| 2002/0065658 A1 | * | 5/2002 | Kanevsky et al. ............ 704/260 |
| 2002/0074396 A1 | * | 6/2002 | Rathus et al. ................ 235/380 |
| 2002/0124020 A1 | * | 9/2002 | Janakiraman et al. ........ 707/513 |
| 2002/0198705 A1 | * | 12/2002 | Burnett ........................ 704/214 |
| 2003/0158737 A1 | * | 8/2003 | Csicsatka ..................... 704/273 |
| 2004/0002808 A1 | * | 1/2004 | Hashimoto et al. .......... 701/107 |

* cited by examiner

*Primary Examiner* — Vijay B Chawan
(74) *Attorney, Agent, or Firm* — Patton Boggs LLP

(57) ABSTRACT

A system and method for communicating one or more audio files through a network. One or more original files of an original web site are converted into one or more audio files. An indication is provided to a user that the one or more original files are available as the one or more audio files in response to the user navigating the one or more original files. The one or more audio files are delivered to a computing device of the user through the network in response to a request to access the one or more audio files.

19 Claims, 3 Drawing Sheets

SYSTEM AND METHOD FOR AUDIO CONTENT NAVIGATION

RELATED APPLICATIONS

This Application claims priority to U.S. patent application Ser. No. 12/637,512, filed Dec. 14, 2009, which is a continuation of U.S. patent application Ser. No. 10/637,970, filed Aug. 8, 2003, now U.S. Pat. No. 7,653,544, issued Jan. 26, 2010, which claims the benefit of U.S. Provisional Application Ser. No. 60/399,892, filed Jul. 31, 2002. The entire contents of which are hereby incorporated by reference in their entirety.

FIELD OF THE INVENTION

This invention relates generally to data processing for the purpose of navigating a computer network. More particularly, this invention relates to a method and apparatus for creating audible websites and enabling visually-impaired users to access and navigate them by keystroke.

BACKGROUND

Websites and many other computer files are created with the assumption that those who are using the files can see the file content on a computer monitor. Because websites are developed with the assumption that users can see, the sites do not convey much content audibly, nor do the sites convey navigation architecture, such as menus and navigation bars, audibly. The result is that visually-impaired users have difficulty using such websites.

Prior art systems have been developed to help visually-impaired users use websites, but these systems often require software and hardware to be installed at the user's computer. Many of these systems simply use screen reading technology alone or in combination with print magnifying software applications. The systems have shown to be costly, unwieldy, and inconvenient. Furthermore, because such technology is installed on the user's computer, visually-impaired users cannot effectively use conventional computer files anywhere except at their own computers. As a consequence, websites and other computer files are often inaccessible to visually-impaired user anywhere except at home.

Several prior art systems have been developed to overcome this problem by enabling visually-impaired users to access some computer information using any touchtone telephone. In essence, a caller accesses a special computer by telephone. The computer has access to computer files that contain audio components, which can be played back though the telephone to the user. For example, a text file that has been translated by synthetic speech software into an audio file can be played back to the user over the telephone. Some systems access audio files that have already been translated; some translate text-to-speech on the fly upon the user's command. To control which files are played, the user presses the keys on the touch-tone keypad to send a sound that instructs the computer which audio file to play.

Unfortunately, these systems also have drawbacks. Large files or those having multiple nesting layers turn the system into a giant automated voice response system, which is difficult to navigate and often very frustrating. Typically only text is played back to the user. Graphics, music, images and navigation systems like those on a website are not. Furthermore, the metallic voice of the computer-generated speech does not convey meaning with inflection like a human does, and is tedious to listen to, especially for significant volumes of information.

Therefore, it is an object of this invention to provide a method and apparatus to translate computer files which have previously been created for the sighted user, particularly websites, into audio files. It is a further object to create audio files that reflect the entirety of the original file, incorporating non-text content such as graphics, music, images and navigation systems like those on a website. It is another object of this invention to provide a method and apparatus to access audio files using any conventional computer system, particularly one connected to the Internet, by locating the audio files on a central computer such as a server. It is another object of this invention to provide a keystroke navigation system to navigate audio files.

SUMMARY

One embodiment provides a system and method for communicating audio files through a network. One or more original files of an original website may be converted into one or more audio files. An indication may be provided to a user that the one or more original files are available as the one or more audio files in response to the user navigating the one or more original files. The one or more audio files may be delivered to a computing device of the user through the network in response to a request to access the one or more audio files.

Another embodiment provides a system for providing audio content to a user over a network. The system may include a network accessing multiple original websites. Each of the multiple websites may be associated with multiple original files. A server hosts one or more of multiple original web sites. The server may include a program operable to convert one or more original files of the one or more of the multiple original websites into one or more audio files, indicate to a user that the one or more original files are available as one or more audio files in response to the user navigating the one or more original files, and deliver the one or more audio files to a computing device of the user through the network in response to a selection of the one or more audio files.

Yet another embodiment provides an apparatus for providing an audio website to a user over a network. The apparatus may include an original website comprising text content and non-text content. The original website may be accessible by the user with a computer connected to the network. The apparatus may include a server connected to the computer of the user through the network, the server may be configured to (a) convert the text and non-text content of the original website into audio files comprising the audio website, (b) assign a hierarchy to the audio files corresponding to the hierarchy of the original website, and (c) deliver the audio files to the computer in response to a selection from a user to access the audio files.

DETAILED DESCRIPTION OF THE INVENTION

The present invention involves creating audio files from files created originally for sighted users. Files created originally for primarily sighted-users are referred to herein as original files. An organized collection of original files is referred to herein as an original website. The invention further involves assigning a hierarchy and navigation system to the audio files based on the original website design; accessing the audio files; and navigating the audio files.

Audio files for the present invention are created by converting text, images, sound and other rich media content of the original files into audio files through a site analysis process. A live human reads the text of the original file and the speech is recorded. The human also describes non-text file content and file navigation options aloud and this speech is recorded. Non-speech content, such as music or sound effects, is also recorded, and these various audio components are placed into one or more files. Any type of content—be it FLASH, HTML, XML, .NET, JAVA, or streaming video—can be described audibly in words, music or other sounds, and can be incorporated into the audio files. A hierarchy is assigned to each audio file based on the original computer file design such that when the audio file is played back through an audio interface, sound is given forth. The user hears substantially all of the content of the file and can navigate within the file by responding to the audible navigation clues.

The audio files are accessed via a user's computer. To implement the system, a small program is installed in an original file which will play an audible tone or other sound upon opening the file, thereby indicating that the file is accessible with the present invention. Upon hearing the sound, the user indicates to the computer to open the associated audio file. The content of the audio file is played though an audio interface, which may be incorporated into the user's computer or a standalone device.

The user navigates the audio files using a keystroke navigation system. Unlike the touchtone telephone systems which require an audio input device, the present system utilized toneless navigation.

Figure 1:
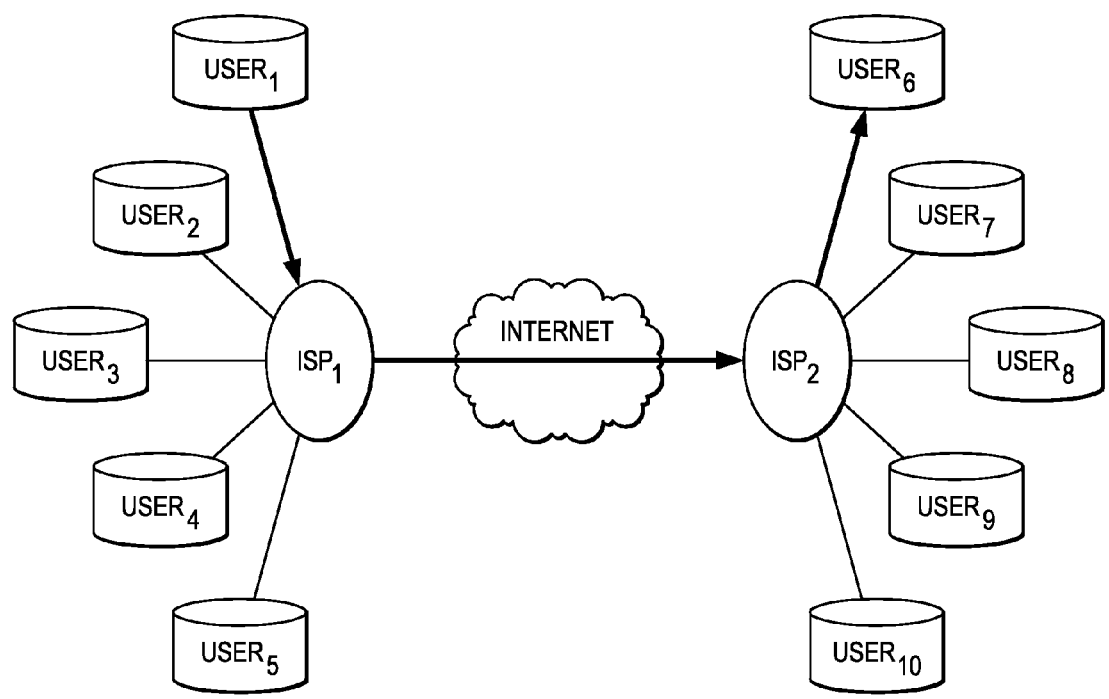
FIG. 1 illustrates the Internet.
Figure 2:
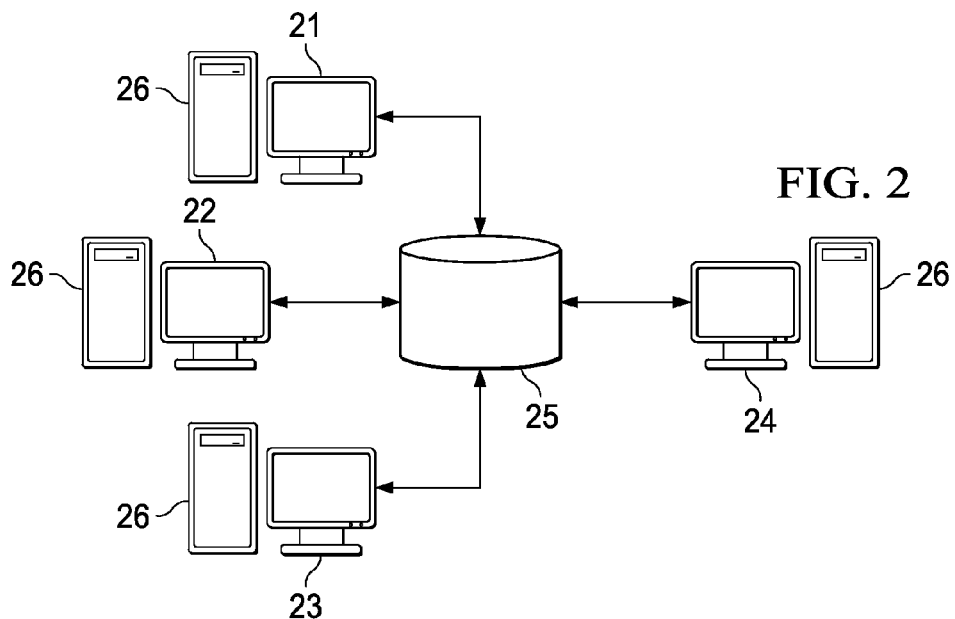
FIG. 2 illustrates a computer network.

One advantage of the present invention over prior art is that no specialized software or hardware needs to be installed on the user's computer because the audio files are installed on remote computers and accessed over a network. This type of application is commonly referred to as a server-side application, to differentiate it over a client-side, or user, application. The preferred embodiment of the present invention is applied to original web pages hosted on remote computers of a global computer network, namely the Internet. FIG. 1 illustrates a plurality of users' computers, indicated as user$_i$ ... user$_x$, communicate with each other through remote computers networked together to form the Internet. Typically, users connect to the Internet via an Internet service provider, abbreviated in FIG. 1 as ISP. However, the present invention may also be used for smaller computer networks, such as local area or wide area networks. FIG. 2 illustrates such a network, where a plurality of users' computers, 21, 22, 23 and 24 communicate through a server 25. In this example, each users' computers has a standalone audio interface 26 to play audio files. Alternatively, the audio interface could be incorporated into the users' computers.

Figure 3:
FIG. 3 illustrates a home page of an original website.

In the preferred embodiment, an original website is converted to an audible website. Each file, or page, of the original website is converted to a separate audio file, or audio page. The collection of associated audio files resides on a remote computer or server, and creates the audible website. For example, FIG. 3 illustrates the home page 30 of an original website. A live human reads aloud the text content 31 of the home page 30 and the speech is recorded into an audio file. The human says aloud the menu options 32, 33, 34, 35, 36 which are "LOG IN", "PRODUCTS", "SHOWCASE", "WHAT'S NEW", and "ABOUT US", respectively, that are visible on the original website. This speech is also recorded.

In a similar fashion, a live human reads aloud the text content and menu options of other files in the original website and the speech is recorded into audio files. In this example, key 1 is assigned to menu option 32, LOG IN; key 2 is assigned to menu option 33, PRODUCTS; key 3 is assigned to menu option 34, SHOWCASE; key 4 is assigned to menu option 35, WHAT'S NEW; key 5 is assigned to menu option 36, ABOUT US. Other visual components of the original website may also be described in speech, such as images or colors of the website, and recorded into one or more audio files. Non-visual components may also be recorded into the audio files, such as music or sound effects.

Figure 4:
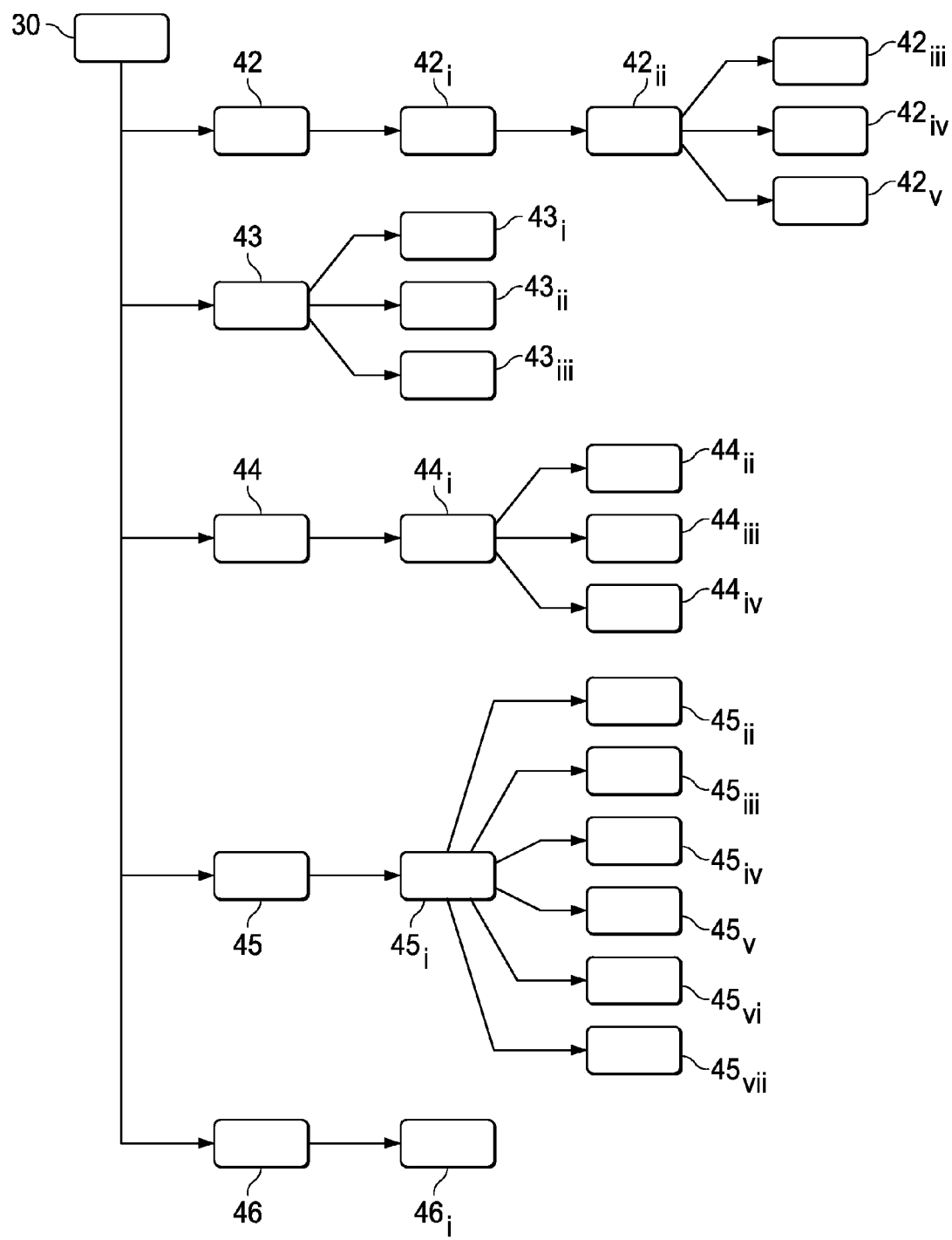
FIG. 4 illustrates the hierarchy of pages in a website.

FIG. 4 shows a hierarchy of the original files which form the original website 40. Menu option 32 will lead to the user to file 42, which in turn leads to the files 42, ...$_v$. Menu option 33 will lead to the user to file 43, which in turn leads to the files 43, ...$_{iii}$. Menu option 34 will lead to the user to file 44, which in turn leads to the files 44 ...$_{iv}$ and etcetera in similar fashion for all the original files of the original website. The collection of audio files will follow a hierarchy substantially similar to that shown in FIG. 4 to form an audible website which is described audibly in its entirety.

In the preferred embodiment, a small software program is installed on the home page of an original website, which plays a tone upon a user's visit indicating that the website is accessible with the present invention. Upon hearing the tone, a user presses a key on his keyboard, preferably the "1" key, and enters the audible website. The original website may close or remain open. After pressing the "1" key, the user navigates the audible website using keystroke command system. Audible narration is played through an audio interface at the user's computer, playing text and menus and indicating which keystrokes to press to listen to the other audio web files with in the audible website. Users can navigate website menus, fast forward and rewind content, and move from website to website without visual clues.

In the preferred embodiment, the device for instructing the computer which audio file to access is a keyboard having at least eighteen keys. The keys include ten numbered menu-option keys, four directional arrow keys, a space bar, a home key, and two keys for volume adjustment. The volume keys may be left and right bracket keys. See FIG. 5. Preferably the navigation system is standard across all participating websites and the keys function as follows:

the keys numbered 1 though 9 select associated menu options 51;

the key numbered 0 selects help 52;

the up arrow selects forward navigation 53;

the down arrow selects backward navigation 54;

the right arrow key selects the next menu option 55;

the left arrow key selects the previous menu option 56;

the spacebar repeats the audio track 57;

the home key selects the main menu 58;

the right bracket key increases the volume of the audible website 59;

the left bracket key decreases the volume of the audible website 60.

Figure 5:
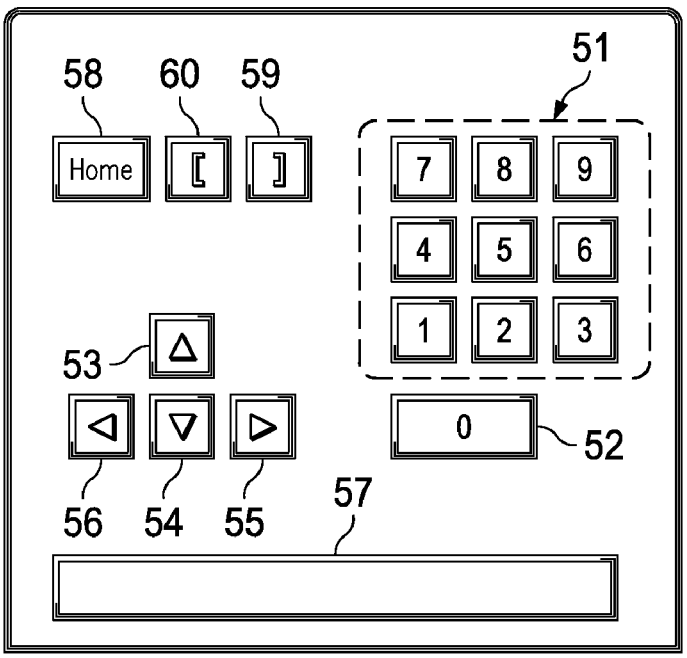
FIG. 5 illustrates the keyboard navigation system.

The keys may be arranged in clusters as shown in FIG. 5, using a standard numeric 10-key pad layout, or use alternative layouts such as a typewriter keyboard layout or numeric telephone keypad layout. Other types of devices may be used to instruct computer navigation. For example, for users who are not dexterous, a chin switch or a sip-and-puff tube can be used in place of a keyboard to navigate the audible websites.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

What is claimed is:

1. A method for communicating one or more audio files through a network, the method comprising:
   converting one or more original files of an original website into the one or more audio files;
   indicating to a user that the one or more original files are available as the one or more audio files in response to the user navigating the one or more original files; and
   delivering the one or more audio files to a computing device of the user through the network in response to a request to access the one or more audio files.

2. The method of claim 1, further comprising:
   providing keystroke navigation enabling the user to navigate the one or more audio files hierarchically associated with the one or more original files.

3. The method of claim 2, further comprising:
   delivering audible narration indicating how to navigate the one or more audio files utilizing the keystroke navigation.

4. The method of claim 1, wherein a plurality of commands for navigating the one or more audio files utilizing keystroke navigation are associated with a plurality of keys of the computing device.

5. The method of claim 1, wherein the one or more original files are converted prior to a user requesting the audio files.

6. The method of claim 1, wherein the one or more original files form the original website, and wherein the audio files are organized hierarchically corresponding to the one or more original files of the original website.

7. The method of claim 1, wherein the original website include a program for performing the indicating using a tone.

8. The method of claim 1, wherein the one or more audio files include visual and non-visual components of an original website including the one or more original files.

9. A server for providing audio content to a user over a network, the server comprising:
   the server is in communication with the network, the server hosts one or more of a plurality of original websites, the server includes a program operable to:
   convert one or more original files of the one or more of the plurality of original websites into one or more audio files;
   indicate to the user that the one or more original files are available as the one or more audio files in response to the user navigating the one or more original files;
   delivering the one or more audio files to a computing device of the user through the network in response to a selection of the one or more audio files.

10. The server of claim 9, wherein the server provides keystroke navigation enabling the user to navigate the one or more audio files hierarchically associated with the one or more original files.

11. The server of claim 10, wherein the server is further operable to stream audible narration indicating to the user how to navigate the one or more audio files utilizing the keystroke navigation.

12. The server of claim 9, wherein a plurality of commands for navigating the one or more audio files utilizing keystroke navigation are associated with a plurality of keys of the computing device.

13. The server of claim 9, wherein the one or more audio files are created prior to the user requesting the audio files.

14. The server of claim 9, wherein the one or more audio files include visual and non-visual components from the one or more of the plurality of original websites.

15. The server of claim 9, wherein the server is further operable to hierarchically organize the one or more audio files associated with the one or more original files of the one or more of the plurality of original websites.

16. An apparatus for providing an audio website to a user over a network, the apparatus comprising:
   a server in communication with the computer of a user through the network, wherein the server accesses an original website comprising text content and non-text content, and
   wherein the server is configured to (a) convert the text and non-text content of the original website into audio files comprising the audio website, (b) assign a hierarchy to the audio files corresponding to the hierarchy of the original website, (c) indicate to the user that the original website is available as an audio website in respond to the user navigating the original website, and (d) deliver the audio files to the computer in response to a selection from a user to access the audio files.

17. The apparatus of claim 16, wherein the one or more audio files are created prior to a user requesting the audio files.

18. The apparatus of claim 16, wherein the user navigates the audio files hierarchically associated with the text content and non-text content utilizing keystroke navigation of the computing device, and wherein a plurality of commands for navigating the audio files utilizing the keystroke navigation are associated with a plurality of keys of the computing device.

19. The apparatus of claim 18, wherein the selection is generated utilizing the keystroke navigation, wherein the keystroke navigation is enabled to a) select menu options; b) advance, rewind, stop, and repeat the audio files; c) move to a next audio file in a hierarchy; and d) move to a previous audio file in the hierarchy.

* * * * *